United States Patent Office 2,731,057
Patented Jan. 17, 1956

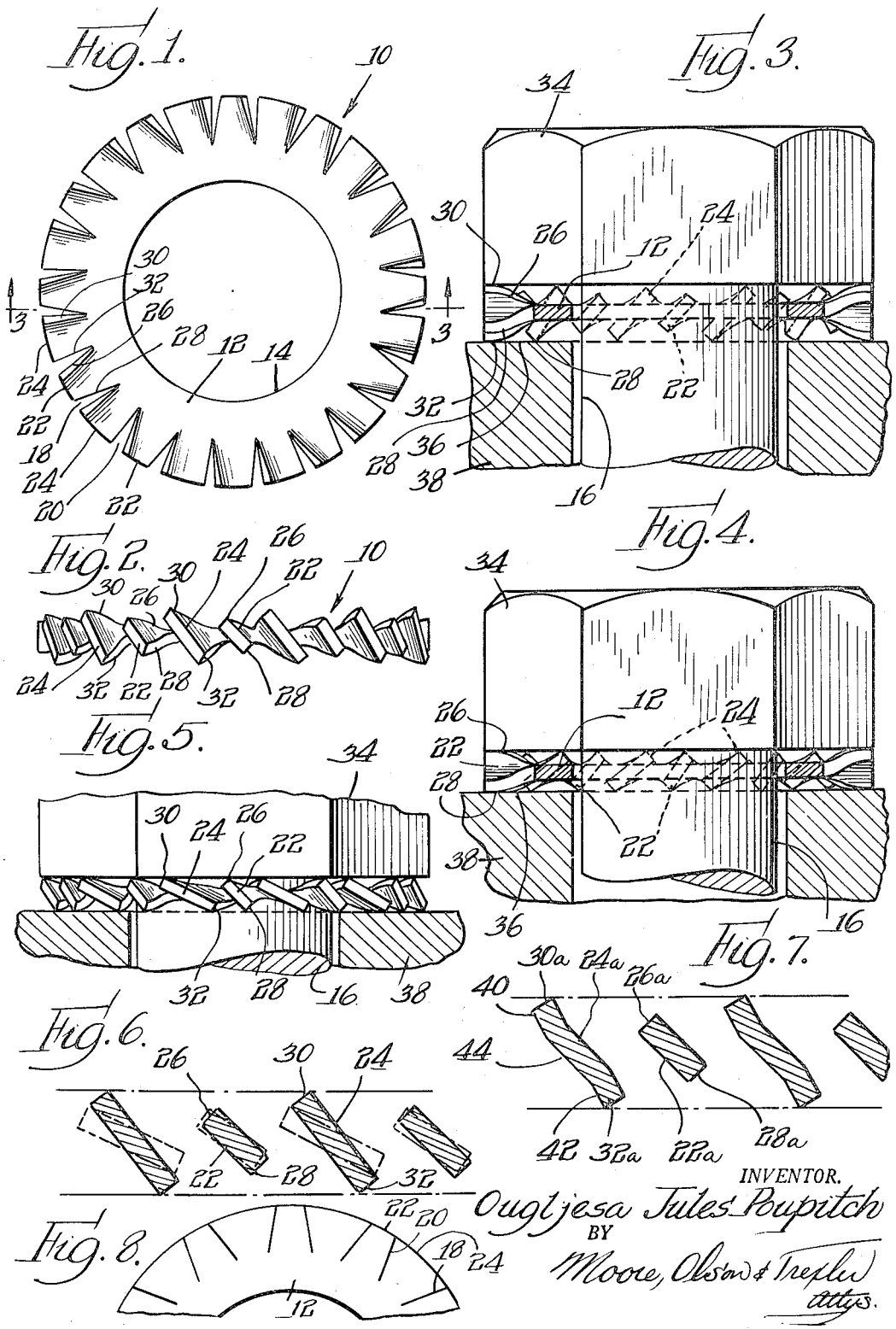
Jan. 17, 1956 — O. J. POUPITCH — 2,731,057
SCRAP ELIMINATING LOCK WASHER HAVING BITING TEETH
Filed March 30, 1953
INVENTOR.
Ougljesa Jules Poupitch
BY Moore, Olson & Trexler
attys.

2,731,057

SCRAP ELIMINATING LOCK WASHER HAVING BITING TEETH

Ougljesa Jules Poupitch, Itasca, Ill., assignor to Illinois Tool Works, Chicago, Ill., a corporation of Illinois Application March 30, 1953, Serial No. 345,606

4 Claims. (Cl. 151—35)

The present invention relates to a novel locking device, and more particularly to a novel lock washer of the twisted tooth type.

Lock washers of the twisted tooth type heretofore known in the prior art, while being satisfactory for most applications, often have several undesirable characteristics. For example, in twisted tooth type lock washers heretofore known, the holding power of the washer often decreases as the teeth are flattened under clamping pressure since the edges of the teeth are then presented at an unfavorable angle for digging into a work surface. In addition, twisted tooth type lock washers heretofore have generally been formed with circumferentially spaced teeth so that the maximum holding power for a given size washer blank is not obtained.

It is a primary object of the present invention to provide a novel lock washer of the above described type, wherein the holding power of the washer is maintained and increased as the washer is clamped between a work surface and a fastener element, such as a screw head or a nut.

Another object of the present invention is to provide a novel lock washer of the above described type, wherein resistance to flattening of the teeth materially increases after the teeth have been flattened a predetermined amount.

Another important object of the present invention is to provide a novel lock washer of the above described type, wherein the teeth are formed in a manner so that scrap material is eliminated, whereby maximum holding power for a given size washer blank is obtained.

Other objects and advantages will become apparent from the following description and the accompanying drawings, wherein:

Fig. 1 is a plan view of a novel lock washer embodying the principles of this invention;

Fig. 2 is a side elevational view of the novel washer shown in Fig. 1;

Fig. 3 is a cross section of the novel washer of this invention taken along line 3—3 in Fig. 1 and showing the washer in position to be clamped between a work piece and the head of a screw;

Fig. 4 is a similar to Fig. 3, but shows the teeth of the novel lock washer of this invention partially flattened between the work piece and the screw head;

Fig. 5 is a side elevational view showing a novel washer of this invention clamped between a work piece and a screw head;

Fig. 6 is a somewhat schematic view illustrating the action of the teeth of the novel washer of this invention;

Fig. 7 is similar to Fig. 6, but shows a modified form of the present invention; and Fig. 8 is a fragmentary plan view, showing the blank from which the novel washer of this invention is formed before the prongs have been twisted.

Referring more specifically to the drawings, wherein like parts are designated by the same numerals throughout the various figures, a lock washer 10 embodying the principles of this invention is shown best in Figs. 1 and 2. The washer 10 is constructed from sheet material, and preferably from resilient sheet steel.

The washer or locking device 10 includes an annular body 12 having a central aperture 14 adapted to receive the shank of a fastening device, such as the shank 16 of a screw member shown in Figs. 3, 4 and 5. An annularly disposed locking section extends radially outwardly from the outer margin of said annular body and is transversely slit or sheared as at 18 and 20, Fig. 8, to provide a plurality of locking elements or prongs 22 and 24. It will be noted that the slits or severances 18 and 20 are disposed in angular or inclined relation with respect to each other so that the resulting sides or edges 26 and 28 of the prongs 22 converge from their roots adjacent the outer margin of the body 12 toward their outer free extremities. Opposed edges 30 and 32 of the prongs 24 diverge from the outer margin of the body 12 toward their outer free extremities. Thus, the outer free extremities of the prong elements 24 are of greater circumferential extent or width than the corresponding outer free extremities of the prongs 22.

As shown for example in Fig. 2, the prong elements 22 and 24 are deflected or twisted to position locking edges or teeth on opposite sides of the bounding planes of the body 12. Thus, the opposed locking teeth of the prongs 22 are coincident normally with planes spaced axially inwardly from the planes coincident with the opposed locking teeth of the prong elements 24. As shown in Fig. 3, when the washer is initially clamped between a head 34 of the screw and an opposite surface 36 of a workpiece 38, the teeth of the wider prongs 24 engage said screw head and work surface. In this position the teeth of the narrower prongs 22 are free from engagement with the screw head and work surface. As the screw head is tightened against the lock washer, the locking teeth of the narrower prongs 22 are ultimately brought into contact with the aforesaid clamping surfaces. The narrower prongs 22 which are preferably twisted or deflected from their roots to their free extremities provide increased resistance to the clamping forces which tend to flatten the prongs. Thus, during the initial axial clamping action the wider prongs set up initial resistance which is followed by increased resistance when the teeth of the narrower prongs are brought into action.

In Fig. 7 the wider prongs 24a of modified form are shown. The narrower prongs 22a bounded by edges 26a and 28a are similar to the previously described narrow locking prongs 22. The prongs 24a bounded by edges 30a and 32a include deflected margins 40 and 42 on opposite sides of an intermediate prong body portion 44.

From the foregoing it will be apparent that the present invention provides a novel sheet metal locking device or washer member of the twisted tooth type wherein the combination of alternate narrow and wider prongs enables initial axial flexing of the washer member over a substantial extent before the entire group of circumferentially disposed locking teeth are brought into play. Also, the foregoing improved locking device makes it possible to utilize substantially the entire circumferential extent of the locking section which encircles the internal washer body. In other words, the locking section of the annular washer element is scrapless in that no material is removed from the outer margin. While the free extremities of alternate teeth vary in circumferential extent, the width of the roots of said teeth adjacent the annular washer body are substantially the same. This insures adequate strength at the base of the prongs and makes it possible to have a relatively large number of locking prongs as compared with washer structures wherein locking prongs are circumferentially spaced.

While the preferred embodiments of the present invention have been illustrated, it is obvious that changes may be made in structural details without departing from the spirit and scope of the appended claims.

I claim:

1. A locking device including an annular sheet metal body and a locking section formed integral with and extending radially outwardly from the outer margin of said body, said locking section being sheared at spaced intervals to present a plurality of adjacently positioned prong elements extending outwardly from said body margin, the circumferential width of said prong elements adjacent said body margin being substantially equal and the circumferential width of alternate prongs at their outer free extremities being less than the corresponding width of the remaining adjacent prong elements, said prong elements being substantially bodily deflected from their roots to their outer extremities to present locking teeth normally positioned beyond opposite bounding planes of the body, substantially the entire circumferential extent of the sheet metal stock encircling said body being utilized for locking purposes.

2. A locking device as set forth in claim 1, wherein the locking teeth of the wider prongs are positioned normally a greater distance beyond the bounding planes of the body than the teeth of the narrower prongs.

3. A locking device as set forth in claim 1, wherein all of the prongs are twisted from their roots adjacent the outer margin of the body to their free extremities about substantially radial axes so as to present locking teeth positioned normally beyond the bounding planes of the body.

4. A locking device as set forth in claim 1, wherein the sheared portions of the locking section present slits which are nonradial.

References Cited in the file of this patent

UNITED STATES PATENTS

| | | |
|---|---|---|
| 1,784,142 | Hosking | Dec. 9, 1930 |
| 1,926,917 | Rosenberg | Sept. 12, 1933 |
| 2,322,776 | Poupitch | June 29, 1943 |

FOREIGN PATENTS

| | | |
|---|---|---|
| 469,369 | Great Britain | July 23, 1937 |
| 1,009,238 | France | Mar. 5, 1952 |